Aug. 25, 1942.  R. L. BROWN  2,294,021
FIXTURE FOR ATTACHING CLIPS IN MOLDINGS
Filed June 21, 1940
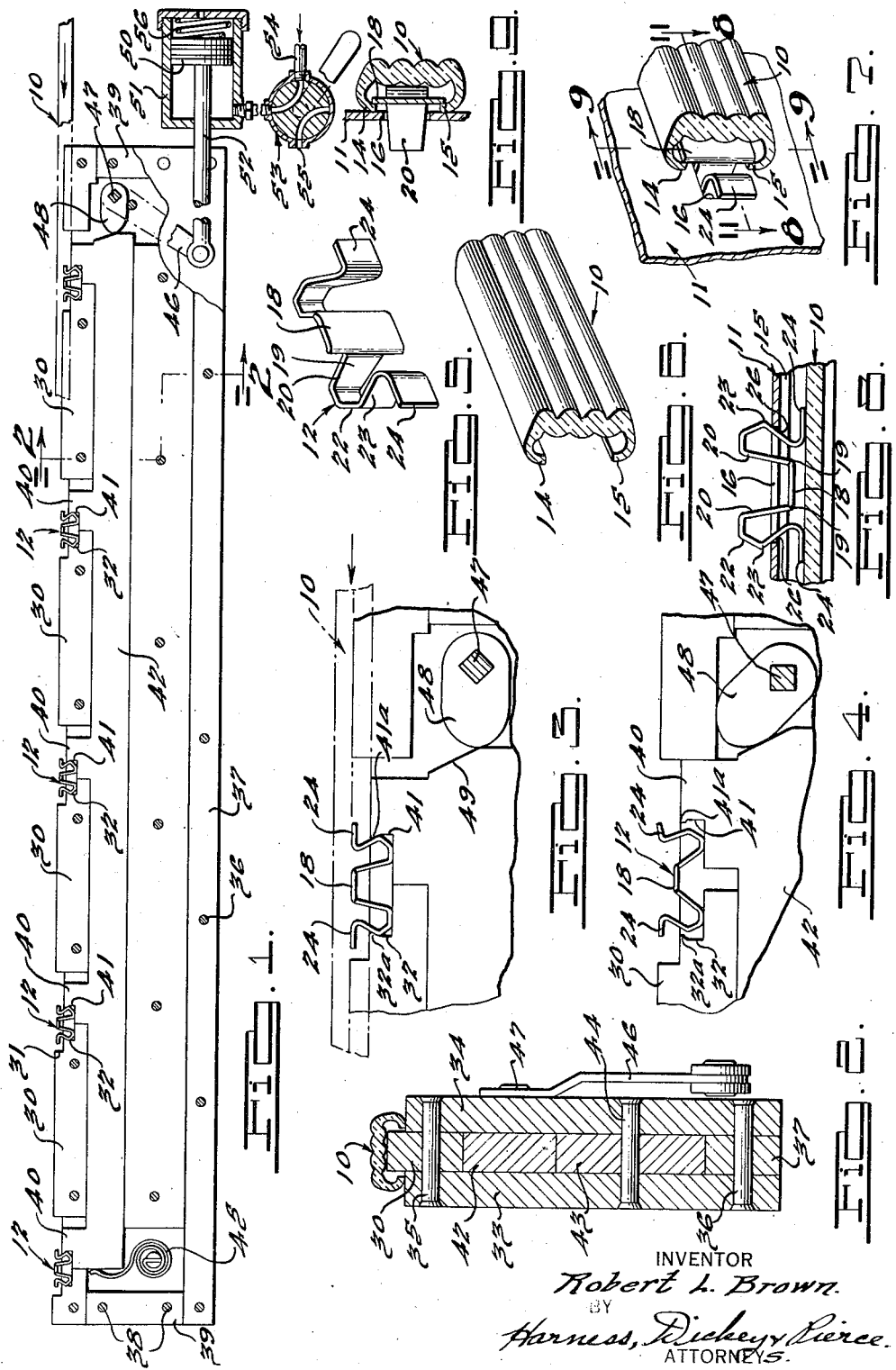
INVENTOR
Robert L. Brown.
BY
Harness, Dickey & Pierce.
ATTORNEYS.

Patented Aug. 25, 1942

2,294,021

UNITED STATES PATENT OFFICE 2,294,021

FIXTURE FOR ATTACHING CLIPS IN MOLDINGS

Robert L. Brown, Detroit, Mich., assignor to William R. Wiley, Detroit, Mich.

Application June 21, 1940, Serial No. 341,737

1 Claim. (Cl. 29—84)

The present invention relates to a method and means for assembling clips in ornamental molding strips and particularly to a method and means for assembling, with molding strips, clips of the type disclosed.

It is the general object of the invention to provide a mechanism for and a method of assembling clips with molding strips which are characterized by their simplicity and the ease and rapidity with which the assembly operation can be effected.

Other objects and advantages of the invention will become apparent from the following specification, the accompanying drawing, and the appended claim.

In the drawing:

Figure 1 is a side elevation of a fixture or mechanism for assembling molding clips in moldings, parts being broken away and parts in section;

Fig. 2 is a section taken on the line 2—2 of Figure 1;

Fig. 3 is an enlargement of a portion of Figure 1, showing the means for operating the movable dies;

Fig. 4 is a view similar to Fig. 3, showing the parts in a different position;

Fig. 5 is a perspective view of the molding clip;

Fig. 6 is a perspective view of a molding strip;

Fig. 7 is a fragmentary assembly view, showing the completed assembly of ornamental molding strip, clip and panel;

Fig. 8 is a section taken on the line 8—8 of Fig. 7; and

Fig. 9 is a section taken on the line 9—9 of Fig. 7.

The present invention relates to an assembly of the type of ornamental molding strip shown best in Figure 6 and indicated generally as 10, with a plurality of retaining clips shown in a perspective view in Figure 5 and indicated generally 12. The clips 12 are intended to secure the molding 10 against the surface of a panel 11, as shown in Figures 7, 8 and 9.

The molding strip, which may be formed of any desired material such as a plastic composition or extruded metal, is of general channel form provided with inturned flanges 14 and 15, as best shown in Figures 1 and 7. The panel 11 is provided with a series of spaced, rectangular holes 16, each adapted to receive a portion of one of the molding clips, as hereinafter described.

As best shown in Figures 5, 7, 8, and 9, the molding clip, which is preferably formed of spring steel, comprises a sheet metal element bent into a general M formation. The completed clip has a central portion 18 which is of greater transverse width than the remainder of the clip, and which is adapted to fit within the molding channel and bridge across the gap between the inturned flanges 14 and 15 thereof, as best shown in Figures 7 and 9. Projecting from opposite sides of the central portion 18 are identical generally U-shaped portions of less transverse width than the central portion 18. Each of these U-shaped portions is formed of an inner leg 20 and an outer leg formed of a pair of angularly related portions 22 and 23, the portion 22 being intermediate the inner leg 20 and the portion 23 of the outer leg. The outer leg portion 23 is provided with a foot 24 adapted to engage the bottom of the molding channel, as best shown in Fig. 8.

The normal formation of the clip is such that when inserted within the molding in the manner illustrated in Fig. 8, the feet 24 on the outer leg portions 23 press downwardly against the bottom of the molding channel, thereby forcing the central portion 18 resiliently against the inner surface of the inturned flanges 14 and 15. It will be noted that, as best shown in Figures 5 and 8, the central portion 18 has its side edges 19 bent in the direction of the inner legs 20 in order to provide a sharp edge which will tend to dig into the inner surfaces of the inturned flanges 14 and 15. This tends to prevent longitudinal movement of the molding strip relative to the clip.

In accordance with the present invention, a plurality of clips 12 are assembled with a molding strip 10 by means of the fixture illustrated in Figures 1 to 4. As there shown, there is provided a plurality of aligned stationary dies 30 having double-stepped recesses 31 and 32, respectively, at one end. The stationary dies are mounted between side plates 33 and 34 to which the stationary dies are secured by any suitable means, such as rivets 35. The plates 33 and 34 are likewise secured together at their bottom portions by rivets 36 with a spacer member 37 between the plates, and at their ends by rivets 38 with an end spacer member 39. Positioned opposite the recesses 32 in the stationary dies 30 are a plurality of movable die members 40 having corresponding recesses 41. The recesses 32 and 41 and the side plates 33 and 34 define pockets or receptacles, each adapted to receive a molding clip 12. The upper edges of the recesses 32 and 41 are provided, respectively, with overhanging edges 32a and 41a adapted to retain the clips against removal from the recesses when the dies are closed upon the clip. All of the dies 40 are formed integrally with a bar 42, which is slidable between the plates 33 and 34 and beneath the stationary dies 30.

The bar 42 rests upon a spacer or filler plate 43, which is secured to the side plates by means of rivets 44. At the left hand end of the fixture is provided a helical spring 45, which acts normally to force the bar 42 to the right and to therefore open the dies. At the righthand end of the fixture, there is provided a lever 46 fixed with respect to a shaft 47 that is journalled for rotation in the side plates 33 and 34. The central portion of the shaft 47 is squared and carries a cam 48 adapted to act against a cam face 49 on the end of the bar 42. When the lever 46 is rotated counterclockwise, as viewed in Figure 1, the cam 48 swings downwardly, forcing the bar 42 to the left and closing the movable dies 40 against the stationary dies 30 against the action of spring 45. This die closing operation is preferably performed by a power means, such as the fluid piston 50 mounted in a cylinder 51 and connected by a rod 52 to the lower end of the lever 46. The left-hand end of the cylinder 51 is connected by a valve 53 to a source of pressure 54 when the valve is in the position shown in Figure 1. This actuates the fixture to close the movable dies 40 upon the stationary dies 30. When the valve 53 is reversed, by a clockwise rotation, from the position shown in Figure 1, the left-hand end of cylinder 51 is connected to an exhaust outlet 55, and a spring 56 in the right-hand end of cylinder 51 reverses the position of the piston 50.

The above described fixture is used in the following manner: With the dies 30 and 40 in the open position illustrated in Figure 4, a plurality of clips 12 are positioned within the die recesses. As best shown in Figure 4, the space between the lower surface of the central portion 18 of clip 12 and the upper plane of the surfaces of the feet 24 of the clip 12 is normally greater than the distance between the inner surfaces of the inturned flanges 14 and 15 and the bottom of the molding strip channel. Accordingly, it is not normally possible to insert the clips in the molding strip channel. However, with the clips loaded in each of the die recesses of the fixture in the manner indicated in Figure 4, if the shaft 47 and cam 48 are rotated by the means illustrated in order to force the bar 42 and the movable dies 40 to the left against the stationary dies 30, the outer legs of the clips 12 will be engaged by the sides of the recesses 32 and 41 and compressed inwardly, as shown in Figures 1 and 3. This has the effect of raising the level of the central portion 18 with respect to the level of the feet 24 until, as best shown in Figure 3, the central portion 18 and the feet 24 are in approximately the same plane. When the clip is distorted in this fashion, it is a simple matter to slide the molding strip 10 endwise over the series of clips held in the dies of the fixture in the manner illustrated in dotted lines in Figures 1 and 3 and in solid lines in Figure 2. As shown in Figure 2, the stationary dies 30 project upwardly above the top edges of the side plates 33 and 34 and thus serve to guide the molding strips 10 along the top of the fixture. When the molding strip reaches the desired position along the fixture relative to the clips 12, the valve 53 is reversed, thus shifting the cam 48 to the position shown in Figure 4 and permitting the spring 45 to open the dies. This die opening movement permits the central portion of each of the clips 12 to move downwardly into tight engagement with the inner surfaces of the inturned flanges 14 and 15, as best shown in Figures 7, 8 and 9, in which position the clip strongly grips the molding channel. Accordingly, the molding strip with the attached clips may be simply lifted from the fixture and is ready for installation on a suitably perforated panel, such as the panel 11 illustrated in Figures 7, 8 and 9.

The panel 11 is provided with openings 16 adapted to receive the U-shaped portions of the clip, and these openings are formed in proper position to receive each of the clips on a given molding. In order to secure the molding to the panel, it is only necessary to hold the molding in a position in which the clips are aligned with the openings 16 and then simply force the clips through those openings. The portions 22 of the outer legs of the clip force the outer legs inwardly and permit the clip to move through the opening into the position illustrated in Figure 8, in which the U-shaped portions of the clip have snapped or expanded outwardly and the portions 23 of the outer legs have resiliently gripped the end walls 26 of the opening 16.

The assembling fixture and method of assembly described herein are exceedingly simple, and can be conducted very rapidly by a single unskilled operator. It is apparent that certain variations in the mechanism and in the procedure outlined are available within the spirit of the invention as outlined herein and within the scope of the appended claim.

What is claimed is:

In a mechanism for use in applying clips to a molding strip of channel shape with inturned flanges, said clips having attaching portions of greater width than the space between said inturned flanges, the combination of, an aligned series of stationary dies, a plurality of movable dies each of which is adapted to move toward or away from one of the stationary dies, each pair of dies comprising one stationary and one movable die defining a clip receiving recess for holding a clip in alignment with the clips received in the recesses of the remaining pairs of dies with the attaching portions of the clips projecting upwardly in position to receive a molding strip, means for simultaneously moving said movable dies toward said stationary dies for the purpose of distorting said clips, and means to engage a molding strip and guide it in endwise movement into a position to receive the attaching portions of all the clips between the molding strip flanges.

ROBERT L. BROWN.